United States Patent [19]

Pesque

[11] Patent Number: 4,893,283

[45] Date of Patent: Jan. 9, 1990

[54] ECHO ULTRASOUND SYSTEM WITH AN IMPROVED IMAGE SEQUENCE RATE

[75] Inventor: Patrick R. Pesque, Perigny, France

[73] Assignee: U.S. Philips Corporation, New York, N.Y.

[21] Appl. No.: 280,612

[22] Filed: Dec. 5, 1988

[30] Foreign Application Priority Data

Dec. 30, 1987 [FR] France ................... 8718387

[51] Int. Cl.$^4$ ............................. G03B 42/06
[52] U.S. Cl. ........................... 367/7; 367/138; 73/620; 128/661.01
[58] Field of Search .............. 267/7, 11, 103, 105, 267/138; 73/620; 128/661.01

[56] References Cited

U.S. PATENT DOCUMENTS

| | | | |
|---|---|---|---|
| 4,070,905 | 1/1978 | Kossoff | 367/104 |
| 4,245,250 | 1/1981 | Tiemann | 367/11 |
| 4,395,912 | 8/1983 | Hassler | 73/626 |
| 4,561,308 | 12/1985 | Bele et al. | 73/626 |
| 4,644,795 | 2/1987 | Augustine | 73/625 |

Primary Examiner—Thomas H. Tarcza
Assistant Examiner—Daniel T. Pihulic
Attorney, Agent, or Firm—Jack E. Haken

[57] ABSTRACT

An echo ultrasound imaging system comprising at least one array of elementary transducers, and further comprising an emission stage and a stage for the reception and for the processing of echoes reflected back towards the said array, said reception and processing stage having means for the simultaneous focusing of M ultrasonic beams originating from M different directions; the emission stage has means for the focusing of M ultrasonic beams emitted sequentially in the said M different directions, and during a total duration defined by the sum of the M maximum delays of the M delay laws forming the said M focused beams emitted.

2 Claims, 2 Drawing Sheets

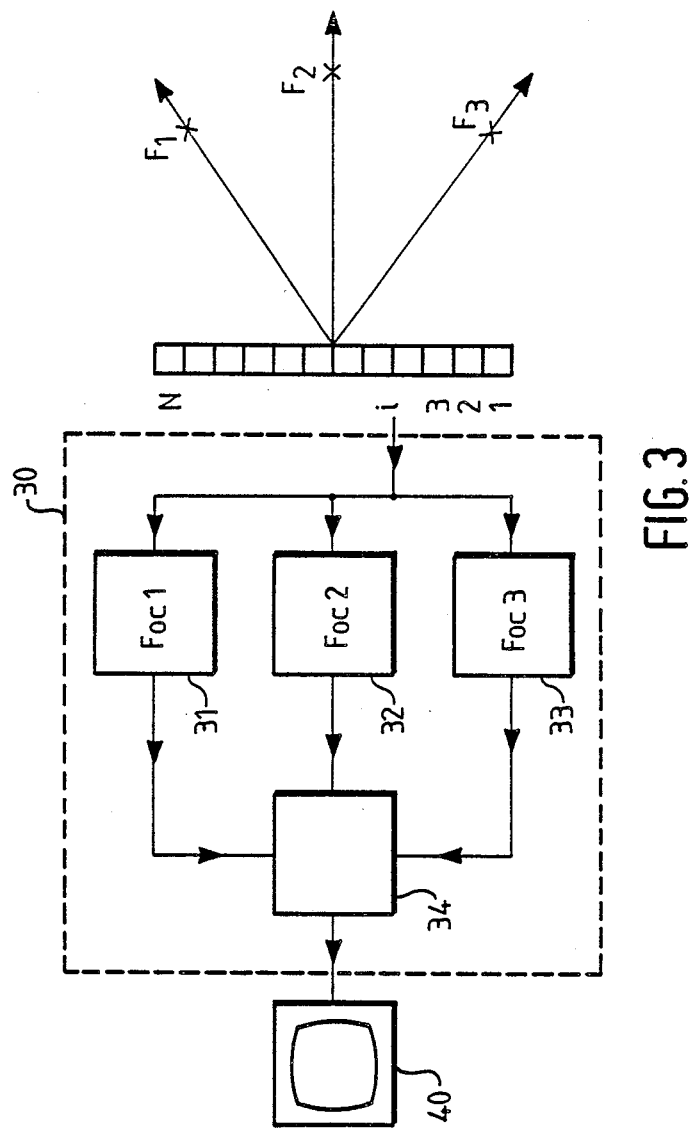

ECHO ULTRASOUND SYSTEM WITH AN IMPROVED IMAGE SEQUENCE RATE

The present invention relates to an echo ultrasound imagining system of the type which comprises at least one array on N elementary transducers, an emission stage and a stage for reception and processing of echographic signals which are reflected back towards the array, wherein the reception and processing stage have means for the simultaneous focusing of M ultrasonic beams originating from M different directions. The invention is particularly advantageous in the field of medical diagnostics.

Echo ultrasound systems using arrays (linear or phased) of transducers existing at the present time are all based on the same principle. This principle involves the emission of an ultrasonic wave in a certain direction and then the monitoring and the recording of the echos originating from this direction. In order to obtain an image, the direction of the wave is sequentially modified: this direction is translated for a linear scanning or deflected for a sectorial scanning.

The major disadvantage of this technique is that it leads to a limited image sequence rate $F_I$. In fact, if C is the speed of propagation of the ultrasonic waves in the tissues, $z_{max}$ the depth examined and $N_a$ the number of acoustic lines used to form the image in the given application, $F_I$ is given by:

$$F_I = C/(2N_a z_{max}).$$

If C=1500 m/s and $z_{max}$=15 cm, the result is the following:

$$F_I = 5000/N_a \text{ images/second}.$$

For $N_a$=100, the result is an image sequence rate of 50 images per second which is, in general, sufficient for the perception in real time of even rapid (heart) movements for standard imagery. However, it is not acceptable for new procedures of ultrasonic imagery such as:

The colour imaging of blood flows by Doppler echography, which requires approximately 10 acoustic lines in each direction in order to obtain a colour image line in order to estimate the distribution of the flow velocity of the blood in this direction. The image sequence rate thus falls to 5 per second; which is insufficient to investigate cardiac flows.

High-resolution imagery, in which emission takes place in a same direction with several focal lengths. The image sequence rate is divided by the number of focal lengths emitted.

The reduction of the random noise ("speckle") by the technique of the mean of the images of a same zone viewed from different angles ("spatial compounding"). In this case, the image sequence rate is divided by the number of different images of the same zone, that is to say approximately 5.

The volume image, in which a series of sections is constructed. The image sequence rate is divided by the number of planes of sections.

A general technical problem to be resolved by any ultrasonic echograph consists in obtaining a sufficient image sequence rate while satisfying the requirements of the new techniques of ultrasonic imagery.

A solution to this general technical problem is provided by U.S. Pat. No. 4,644,795, which describes an ultrasonic echograph, the reception and processing stage of which has means for the simultaneous focusing of M ultrasonic beams, originating from M different directions, which beams are reflected from a emitted beam which is relatively wide and has a rectangular profile. This known technique effectively permits multiplication of the sequence rate by M. Nevertheless, it is not free from imperfections, since the echoes are reflected from a wide beam, and therefore not focused, the overall resolution is markedly reduced.

Thus, the technical problem to be resolved by the subject of the present application is an ultrasonic echograph, by virtue of which it would be possible to increase the image sequence rate without nevertheless giving rise to any limitations of the resolution.

The solution to the technical problem posed herein above consists, according to the present invention, in that the said emission stage has means for the focusing of M ultrasonic beams emitted sequentially in the said M different directions, and during a total duration defined by the sum of the M maximum delays of M delay laws forming the said M focused beams emitted.

As the said duration of sequential emission is very short, this leads to the formation of the compromise of an increase in the image sequence rate by a factor M without prejudice to the resolution of the echograph, since the emission and reception beams are focused.

The description which will follow, with reference to the accompanying drawings:

FIG. 3 is a diagram of the reception and processing stage of the ultrasonic echograph according to the invention.

The disclosure of U.S. Pat. No. 4,644,795 is incorporated herein by reference.

Figure 1:
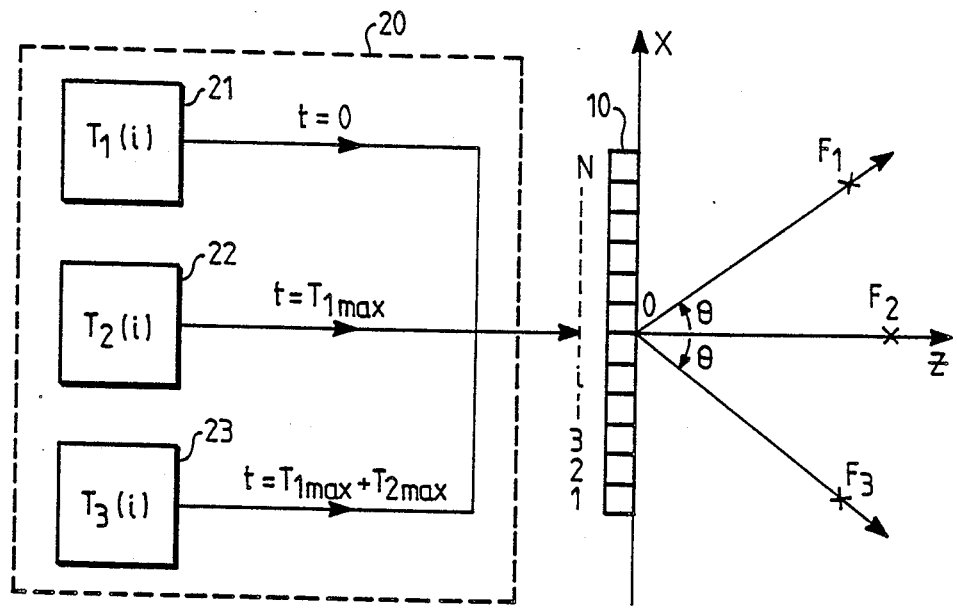
FIG. 1 is a diagram of the emission stage of an ultrasound echograph according to the invention.

FIG. 1 shows diagrammatically an ultrasonic echograph comprising an array 10 of N elementary transducers numbered from i=1 to N. This ultrasonic echograph further comprises an emission stage 20 which has means 21, 22, 23 for the focusing of M=3 ultrasonic beams emitted sequentially in the three different directions represented by the focusing points F1, F2, F3. These focusing means 21, 22, 23 are conventional circuits including delay lines which permit, in accordance with the principle of electronic focusing, the focusing of an ultrasonic beam at any point by varying the instants of excitation of each elementary transducer i. Thus, each circuit 21, 22, 23 implements a delay law $T_j(i)$ corresponding to the focusing point $F_j(X_j,Z_j)$ and defined by:

$$T_j(i) = \frac{1}{C}(\sqrt{(X_j + (N-1)P/2)^2 + Z_j^2} - \sqrt{(X_j + (N-1)P/2 - (i-1)P)^2 + Z_j^2}\,)$$

where P is the pitch of the array 10 of the transducers.

Figure 2:
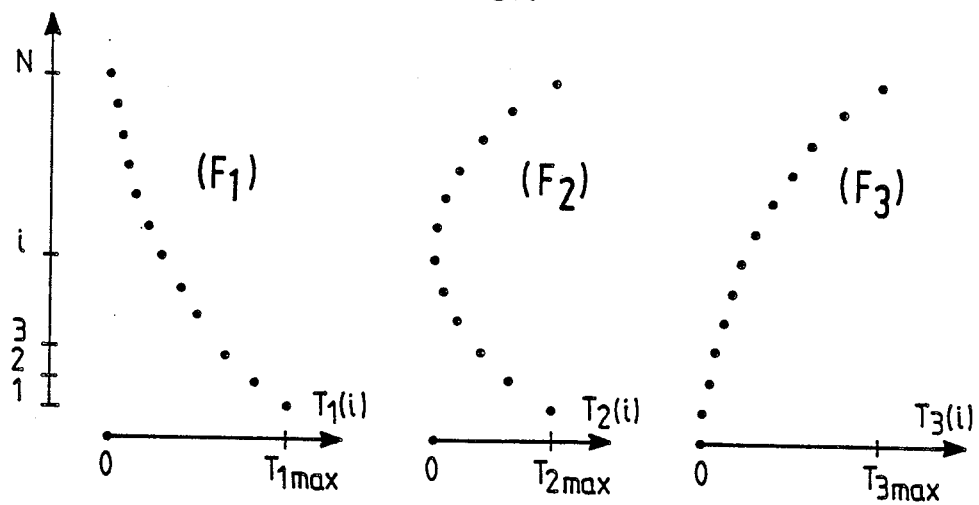
FIG. 2 shows a cross-sectional diagram how, according to the invention, three beams focused in three different directions are sequentially emitted.

The three phase laws $T_1(i)$, $T_2(i)$, $T_3(i)$ corresponding to the three directions F1, F2 and F3 are represented in FIG. 2.

As the duration of excitation of the N elementary transducers is relatively short (a few microseconds), it is possible, as soon as the emission of the first beam towards F1 is terminated, to reemit a second beam in the direction F2 and so on, to such extent as is necessary. The sequence is then the following:

at t=0, emission of the beam focused at F1
at t=T1max, emission of the beam focused at F2.
at t=T1max+T2max, emission of the beam focused at F3.

Accordingly, the duration of the complete emission sequence is the time T=T1max+T2max+T3max, i.e. the sum of the three maximum delays of the three delay laws forming the said three focused beams emitted.

During the time T, it is not possible to commence receiving the beam originating from the directions F1 and F2. However, this duration T is fairly short (10 to 20 μs) and represents only a small thickness (7.5 to 15 mm) of tissues. In general, this thickness is not of interest, since it contains only skin or fat. If, nevertheless, it were desired to analyse it, it would be sufficient to shift the surface of the transducer by the corresponding thickness (7.5 to 15 mm) from the skin of the patient by means of a "wedge" (for example a water pocket) which is transparent to the ultrasonic waves.

Finally, it is seen that the image sequence rate has indeed been multiplied by M (in this case 3) while preserving the focusing on emission.

The limitation to the number M is, in principle, associated with the crosstalk which might occur between two consecutive beams if the angle θ becomes to small. In practice, it is possible to show that an anlge θ of 5° does not produce any crosstalk, for example at a distance z of 30 mm the separation between two beams is Δx=ztan θ=3.5 mm; this is markedly greater than the lateral resolution obtained with current high-performance systems (of the order of two wavelengths, i.e. 1 mm at 3MHz). It would then be possible to use M=18 (=90/5) quasi-simultaneous beams for a 90° sectorial analysis.

Nevertheless, this limit remains theoretical, as the processing of 18 beams would involve a high cost in terms of electronic circuits and, on the other hand, the "blinding" of the echograph would have a duration of 60 to 120 μs, corresponding to a lost thickness of 45 to 90 mm; this is prohibitive.

The circuit 30 for the reception and for the processing of echoes represented in FIG. 3 is similar to that described in U.S. Pat. No. 4,644,795. The N signals of each elementary transducer are sent in parallel towards M=3 focusing systems, 31, 32, 33, successively focusing each one of the signal i in one of the M=3 directions emitted.

The signals $s_1(t)$, $s_2(t)$, $s_3(t)$ thus formed are sent to a processing unit 34 which may be either a unit for the extraction of envelopes for the imagery of organs, or a unit for the estimation of speed in the case of the visual display of blood flows by Doppler echography. Finally, the signal emerging from the processing unit 34 is sent to a display device 40.

I claim:

1. In an echo ultrasound imaging system of the type which comprises an array of transducer elements, emission means connected to the array for transmission of ultrasound, and receiving means connected to the array for simultaneous reception of a plurality, M, of focussed ultrasound echo beams from M different directions; the improvement wherein the emission means sequentially transmit M beams in said M different directions and the receiving means simultaneously receive echoes from said M beams.

2. The system of claim 1, wherein the emission means comprise:

M delay means each of which is connected to elements of the array to effect transmission of a focussed beam of ultrasound in one of said directions by selectively delaying exciting signals applied to said elements in accordance with a delay law, each of said delay means being characterized by a maximum delay which is the largest delay applied by that delay means to said exciting signals and means for sequentially activating said delay means so that said M beams are sequentially transmitted during a time period which is equal to sum of the maximum delays of said delay means.

* * * * *